3,427,283
Patented Feb. 11, 1969

3,427,283
HARDENABLE BORON-CONTAINING SYNTHETIC RESINS COMPRISING THE REACTION PRODUCT OF A CYCLIC ARYL BORATE AND ANHYDROUS FORMALDEHYDE
Franz-Joseph Huster, Troisdorf, Germany, assignor to Dynamit Nobel Aktiengesellschaft, Cologne, Germany, a corporation of Germany
No Drawing. Filed Oct. 11, 1965, Ser. No. 494,963
Claims priority, application Germany, Oct. 16, 1964,
D 45,650
U.S. Cl. 260—51
Int. Cl. C08g 33/18
10 Claims

ABSTRACT OF THE DISCLOSURE

Method for the preparation of hardenable, boron containing synthetic resins, which comprises condensing anhydrous formaldehyde and a cyclic aryl borate of the formula

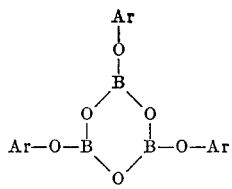

wherein Ar is an aryl radical. These hardenable resins are characterized by a low viscosity which renders them highly suitable for handling in industrial utilizations. The method and the hardenable resins are claimed.

---

The object of the invention is a method for the preparation of boron-containing, hardenable synthetic resins, characterized in that cyclic aryl borates are, by heating, condensed with formaldehyde or formaldehyde-yielding substances, possibly in stages.

My copending application Ser. No. 143,995, filed Sept. 28, 1961, discloses that mixture of condensed aryl borates of the general formula $BO_x(OR)_y$ where R may be a phenyl and/or cresyl radical and $x$ is 0 to less than 1, and $y$ is greater and 1 and up to 3 ($y$ can therefore be 3), and $2x+y=3$ can be condensed with paraformaldehyde on heating, and can be converted into thermosetting plastics by hardening with hardeners or by heating which is customary for phenolformaldehyde resins. The unhardened condensation products are essentially mixtures of open-chain aryl borates including the structure

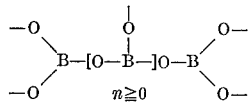

The heat resistance of these aryl borates reacted with formaldehyde and the final hardened resins is largely determined by the ratio B:aryl radical. Because of their high viscosity, it is, however, difficult to react aryl borates with a B:aryl radical ration of 1:1 with paraformaldehyde under industrial conditions. This characteristic has hitherto generally been considered a disadvantage, in spite of the good properties of the hardened products.

It has now been found that it is also possible to prepare boron-containing, hardenable synthetic resins with good processing characteristics by condensing with heat, cyclic aryl borates of the general formula

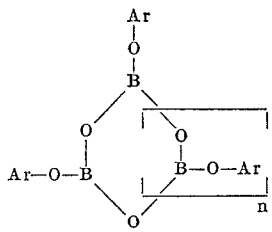

wherein $n$ may be 1–4, preferably 1, and Ar is a possibly substituted aryl radical, with anhydrous formaldehyde or formaldehyde-yielding substances, possibly in stages. Ar may be substituted with one or several substituents out off the group consisting of halogens (e.g. fluorine or chlorine), alkyl (e.g. methyl, ethyl, isopropyl, n-propyl, tert. butyl, nonyl, dodecyl and the like), or lower alkoxy (e.g. methoxy ethoxy etc.) radicals. By "lower" in reference to alkoxy is meant up to 4 carbon atoms.

The reaction of the cyclic aryl borates which may also be called aroxyboroxins, with anhydrous formaldehyde or formaldehyde-yielding substances takes place on heating. This reatcion may also be accelerated by the introduction of catalysts (for example, p-toluene sulfonic acid). Formaldehyde-yielding substances are, in the sense of the present invention, in addition to paraformaldehyde, trioxane, tetroxane, also the hemiformals of $CH_2O$ and primary or secondary alcohols (for example cyclohexanol hemiformal), which may also be split under the influence of catalysts. Suitable catalysts for the splitting of the formaldehyde-yielding substances named can be, for example, hexamethylene-tetramine, Lewis acids, $B_2O_3$, $P_2O_5$, pyrophosphoric acid, or their mixtures. In place of the formaldehyde-yielding sustances mentioned, it is also possible to use for the condensation low-molecular polymethylol compounds of phenols, urea, melamine and similar substances, which also split off formaldehyde. Formaldehyde or formaldehyde-yielding substances may be used in such amounts, that a maximum of Z mols of formaldehyde or equivalent amounts of formaldehyde-yielding substances are used per mol of cyclic aryl borate, where Z stands for the number of sites which can react with formaldehyde. In the case of triphenoxyboroxin, Z has a value of 9. The mol proportion of formaldehyde to cyclic aryl borate can be 2–18.

The cyclic aryl borates which sometimes are also called metaboric acid esters, of the general formula described, can be prepared from orthoboric acid esters of the formula $B(OAr)_3$ and boron oxide in a molar ratio of 1:1 by heating at atmospheric pressure in a manner known per se.

The cyclic aryl borates used for the preparation of the hardenable, boron-containing synthetic resins must contain sites in the phenolic raidcal which are reactive toward formaldehyde. It is, however, not necessary that all of the phenolic radicals contain reactive sites. For the property of hardenability, it is sufficient that at least 2 sites reactive toward formaldehyde are reacted per mol of cyclic borate.

Condensation of the cyclic aryl borates with formaldehyde or formaldehyde-yielding substances to provide the hardenable resins of the invention can be carried out in one or several stages according to the present method. In the one-stage method, one proceeds preferably in such a manner that the reaction is started in a range of 20°–50° C. and the temperature is slowly and continuously raised to about 100° C.; the velocity at which the temperature is increased depends on the size of the batch and the reactivity of the phenolic radicals.

In addition to this one-stage method of reaction, the present process may also be carried out in several stages, a two-stage process being preferred. The reaction steps may be designated as the condensation phase and the prehardening phase. In the two-stage process, cyclic aryl borate is reacted with formaldehyde first at room temperature or in a temperature range of about 40–80° C., preferably between 50–60° C. Cyclic aryl borates, which are to be reacted with formaldehyde or formaldehyde-yielding substances already at room temperature, are subjected more suitably to a preliminary treatment in order to lower the melting point. This can take place in such a manner that the melted cyclic aryl borate is added first with an amount of 1/10 to 1/20 of the formaldehyde or the formaldehyde-yielding substance required for the condensation. The product obtained remains liquid during cooling and may then also be condensed with formaldehyde at lower temperatures.

The cyclic aryl orate-formaldehyde condensation product is then subjected to prehardening in the second reaction phase. This prehardening is suitably carried out in a temperature range of about 80–100° C.; higher or lower temperatures may also be used for prehardening. However, prehardening is hard to control at higher temperatures, while an uncatalyzed prehardening at low temperatures generally takes place too slowly for an industrial process. Prehardening can also be accelerated by the addition of catalysts (for example, hexamethylenetetramine).

The resins prepared according to the present method largely resemble phenolformaldehyde resins in their processing characteristics. They are soluble in low-boiling alcohols and can be hardened in a manner known per se with or without known fillers (asbestos, etc.), dyes, pigments and the usual additives in phenol-formaldehyde molding technology.

The hardening of the resins according to the present invention can be conducted in the known manner with or without hardening agents at a temperature between 150–200° C.

The resins prepared according to the invention are valuable molding and coating compounds which can be processed for the preparation of difficultly inflammable molding compounds etc., either directly or with the additives mentioned.

The resins prepared according to the invention have excellent temperature resistance in the hardened condition. A molding material prepared in a manner known per se from asbestos and the resin prepared according to the invention, after 1000 hours storage at 260° C. shows no decline in its mechanical values, but rather an increase. After 50 hours storage at 340° C., the bending strength and impact resistance of the hardened boron resin-asbestos molding materials are even higher than the control values of the molding compound which was not stored in a hot environment. Beyond that, molded pieces may be heated for several hours up to 400° C., without the occurence of blisters, or fissures.

There also exists, of course, the possibility of mixing in known resins like those based on phenol, melamine, urea, etc. or known boron resins according to the invention, or of condensing such compounds jointly.

The method according to the present invention is illustrated by the following examples:

EXAMPLE 1

10 g. of paraformaldehyde were stirred into a melt heated to about 90° of 359.4 g. of tripenoxyboroxin within 30 minutes. After cooling the mass down to 60° C., another 98 g. of paraformaldehyde were added in portions while stirring. The temperature was kept at 60–65° C. After completion of the addition, the mixture was heated carefully to 90–100° C. and further condensed to the desired degree of resinification. The product is the hardenable resin of the invention.

EXAMPLE 2

54 g. of trioxane were added slowly to a melt of 179.7 g. of triphenoxyboroxin while stirring and at the same time cooling it down slowly to about 60° C. After completion of the addition, the mixture was heated slowly to 90–100° C. and further condensed to the desired degree of resinification. The product is the hardenable resin of the invention.

EXAMPLE 3

Instead of 359.4 g. of triphenoxyboroxin 401.9 g. of tri-(3-methyl-phenoxy) boroxine were converted into a hardenable resin in the same manner as described in Example 2.

EXAMPLE 4

201 g. of tri-(3-methylphenoxy)-boroxin were reacted according to Example 2, yielding a hardenable resin.

EXAMPLE 5

393.2 g. of diphenoxy-2,3,4,5,6-pentachlorophenoxyboroxin were reacted according to Example 1, but using only two-thirds of the amounts of paraformaldehyde mentioned. The boroxin applied in this example was produced by replacing one third of the triphenylborate by tri-2,3,4,5,6-pentachlorophenylborate in the reaction with boron oxide.

EXAMPLE 6

403 g. of diphenoxy-4-ethoxyphenoxy-boroxin were reacted according to Example 1, but using only eight-ninths of the paraformaldehyde. The starting material used is produced by replacing one-third of the triphenylborate by tri-4-ethoxyphenylborate in the reaction with boron oxide.

What is claimed is:

1. Method for the preparation of hardenable, boron containing synthetic resins, which comprises condensing anydrous formaldehyle and a cyclic aryl borate of the formula

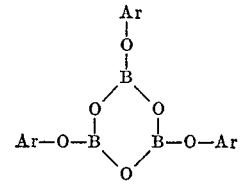

wherein Ar is an aryl radical.

2. Method of claim 1, wherein the anhydrous formaldehyde and cyclic aryl borate are heated at 20–100° C. for the condensation.

3. Method of claim 1, wherein paraformaldehyde is combined with cyclic aryl borate and is converted to formaldehyde for the condensation.

4. Method of claim 1, wherein trioxane is combined with cyclic aryl borate and is converted to formaldehyde for the condensation.

5. Method of claim 1, wherein the mol proportion of formaldehyde to cyclic aryl borate is 2–18.

6. Method of claim 1, wherein the cyclic aryl borate is triphenoxyboroxin.

7. Hardenable resin comprising the condensation product of an anhydrous formaldehyde and a cyclic aryl borate of the formula:

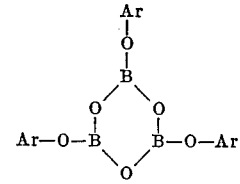

wherein Ar is an aryl radical.

8. Resin according to claim 7, the mol proportion of formaldehyde to cyclic aryl borate being 2–18.

9. Hardenable resin comprising the condensation product of anhydrous formaldehyde and triphenoxyboroxin.

10. Hardenable resin comprising the condensation product of anhydrous formaldehyde and triphenoxyboroxin, in the mol proportion of 2–18 to 1.

References Cited

UNITED STATES PATENTS

| | | | |
|---|---|---|---|
| 2,623,866 | 12/1952 | Twiss et al. | 260—37 |
| 3,093,675 | 6/1963 | Shepherd | 260—462 |
| 3,153,671 | 10/1964 | Ashby | 260—583 |

WILLIAM H. SHORT, *Primary Examiner.*

HOWARD SCHAIN, *Assistant Examiner.*

U.S. Cl. X.R.

117—137; 260—33.4, 38, 53, 839, 840